United States Patent

Wilkes

[15] 3,643,786
[45] Feb. 22, 1972

[54] MANURE SPREADER FLOOR CONVEYOR MEANS

[72] Inventor: Raymond Steele Wilkes, Moline, Ill.
[73] Assignee: Deere & Company, Moline, Ill.
[22] Filed: Aug. 26, 1969
[21] Appl. No.: 853,136

[52] U.S. Cl. ............................................. 198/173, 198/203
[51] Int. Cl. ................................................... B65g 19/02
[58] Field of Search ................. 198/173, 172, 174, 194, 189

[56] References Cited

FOREIGN PATENTS OR APPLICATIONS

| 1,212,571 | 10/1959 | France | 198/188 |
| 1,126,122 | 11/1956 | France | 198/172 |
| 1,368,646 | 6/1964 | France | 198/189 |

Primary Examiner—Gerald M. Forlenza
Assistant Examiner—George F. Abraham
Attorney—H. Vincent Harsha, Harold M. Knoth, William A. Murray, John M. Nolan and Jimmie R. Oaks

[57] ABSTRACT

A manure spreader floor conveyor means includes a conveyor that has a pair of spaced endless log or proof-coil chains interconnected by transverse flights. Specially configured drive and idler sprockets operatively engage the links of the chains and accommodate cylindrical flight connections which interconnect central material engaging portions of the flights with the chains.

10 Claims, 8 Drawing Figures

INVENTOR.
R.S. WILKES

*INVENTOR.*
R. S. WILKES

MANURE SPREADER FLOOR CONVEYOR MEANS

BACKGROUND OF THE INVENTION

This invention relates to a manure spreader floor conveyor means and more particularly relates to a conveyor that includes a pair of spaced parallel endless log or proof-coil chains interconnected by spaced flights.

The most common types of discharge conveyors for manure spreaders are those which include a pair of spaced chains of steel detachable links interconnected by spaced flights. One example of such a conveyor is disclosed in U.S. Pat. No. 3,314,527. These chains do not have the strength to operate properly to discharge manure that is in a frozen or otherwise hard state. Also, these conveyors do not have an acceptable wear life when used in large capacity spreaders where the weight of material on the conveyor is considerable.

SUMMARY OF THE INVENTION

According to the present invention, there is provided a manure spreader floor conveyor means and more particularly, there is provided a conveyor chain, a drive sprocket means and an idler sprocket means which cooperate in a manner especially conducive to properly discharge manure that is in a frozen or otherwise hard state.

Specifically, it is an object of the invention to provide a pair of endless log or proof-coil chains interconnected by spaced flights.

It is a further object to provide drive sprockets which are specially designed to fit the log or proof-coil chains and which have clearances for foreign material and provision for self-cleaning.

Another object is to provide idler sprockets which are of open construction to prevent buildup of frozen material and which are shaped to crush material which feeds between the chain and the sprockets.

Another object is to provide flighting which includes generally cylindrical attaching portions at the ends of the central material engaging portion, the attaching portions being connected to the log chain to give a strong joint that acts similar to a link of a roller chain as it goes over the drive sprockets.

Still another object is to provide a floor conveyor chain which is of strong and robust construction and is easily manufactured.

These and other objects will become apparent from the following detailed description and accompanying drawings.

BRIEF DESCRIPTION OF THE DRAWINGS GS

DESCRIPTION OF THE PREFERRED EMBODIMENT

Figure 1:
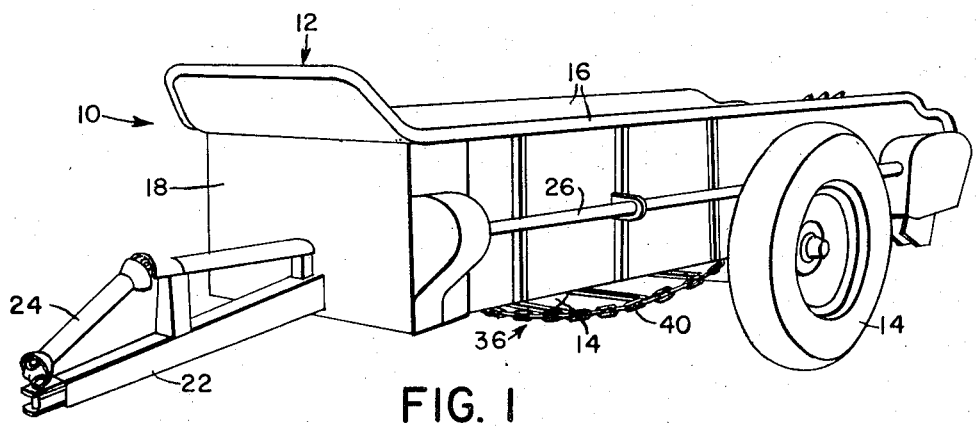
FIG. 1 is a perspective view of the manure spreader in which the present invention is embodied.

Referring now to the drawings, there is shown a manure spreader 10 that includes a box 12 supported on ground wheels 14 and having opposite sides 16, a front 18 and a bed or floor 20 that includes fore-and-aft channellike opposite sides 21. A hitch 22 extends forwardly from the front 18 of the box 12 and supports a power takeoff shaft 24 operatively interconnected by conventional means (not shown) with a fore-and-aft drive shaft 26 at the side of the box 12. The drive shaft, in turn, may be selectively drivingly connected by conventional means (not shown) to a conveyor drive shaft 28 rotatably mounted at the rear of the bed in the opposite sides 21. Fixed for rotation with the drive shaft 28 are a pair of drive sprockets 30, only one being shown. An idler shaft 32 is rotatably mounted at the front of the bed 20 in the opposite sides 21 and fixed for rotation with the idler shaft 32 are a pair of idler sprockets 34, each being in longitudinal alignment with a respective drive sprocket.

Figure 4:
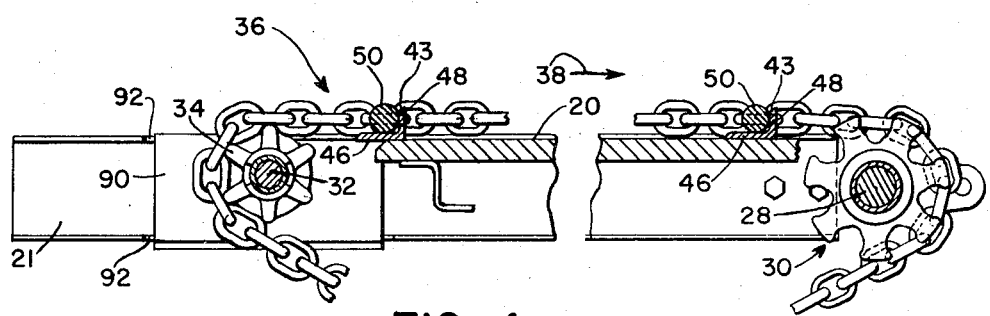
FIG. 4 is a sectional view taken generally along the lines 4—4 of FIG. 2.

A conveyor 36 has a top run overlying the bed 20 adapted for movement in the direction of the arrow 38 (FIG. 4) and a bottom run underneath the bed 20. The conveyor 36 includes a pair of parallel, log or proof-coil chains 40 trained over aligned sprockets 30 and 34. The chains 40 include alternately horizontal and vertical links 41 and 42, respectively. Fore-and-aft spaced, transverse flights 43 interconnect links 41. The flights 43 include a central material engaging portion 44, which is L-shaped in cross section with a horizontal trailing leg 46 engageable with the bed 20 and a vertical leading leg 48, and generally cylindrical connecting portions 50 and 52 fixedly interconnected, as by welding, to the selected horizontal links and the respective ends of the flights at the intersection of the horizontal and vertical legs.

Figure 6:
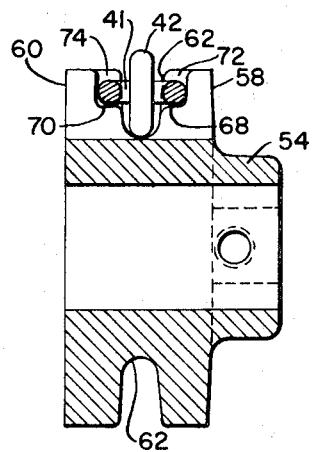
FIG. 6 is a sectional view taken along line 6—6 of FIG. 5 but showing the flight connector removed.
Figure 5:
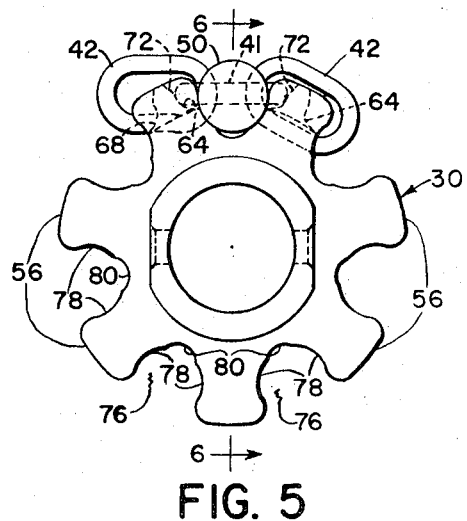
FIG. 5 is a side view of one of the drive sprockets showing a chain segment meshed therein along with one of the flight connectors.
Figure 8:
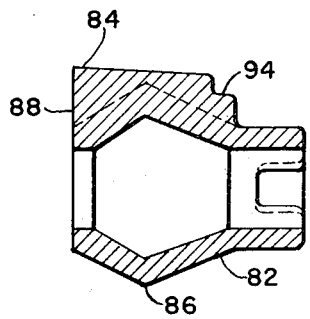
FIG. 8 is a sectional view taken along line 8—8 of FIG. 7.
Figure 7:
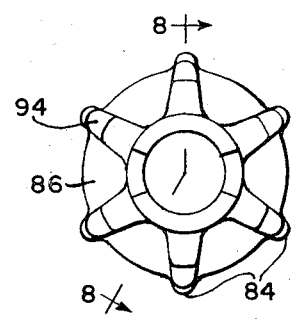
FIG. 7 is a side view of one of the idler sprockets.

Each drive sprocket 30 includes a hub 54 and seven equispaced radial teeth 56 which are bisected into substantially equal right- and left-hand opposed sections 58 and 60 (FIG. 6) by an annular groove 62 adapted to receive the vertical links 42 of the chain 40. The outer, radial portion of the groove 62 is stepped axially opposite at the leading and trailing edges of each tooth 56 to form right and left leading ledges (only right ledge 64 is shown), right and left trailing ledges 68–70, and intermediate right and left driving portions 72 and 74, the leading and trailing ledges of adjacent teeth being adapted for supporting the horizontal links 41 of the chains 40 with the intermediate driving portions 72 and 74 at opposite ends of the horizontal links 41. Between the teeth 56 are openings 76 defined by radially opening, semicylindrical portions 78 having at their base smaller semicylindrical relief portions 80. The larger semicylindrical portions 78 are adapted for receiving the cylindrical connecting portions 50 and 52 of the conveyor flights 43 in much the same fashion that a roller of a roller link chain is received in its drive sprocket.

Each idler sprocket 34 includes a hub 82 having six equispaced, radially extending fins 84. The fins 84 are adapted to mesh between adjacent ones of the vertical links 42 of the respective chains 40 and support or engage the horizontal links 41. The hub 82 is tapered radially outwardly from its opposite ends to form an intermediate edge 86 upon which the vertical links of the chain 40 bear as they travel around the sprocket and which crushes material passing between the chain and the sprocket. The outer end 88 of each of the idler sprockets 34 is positioned against a chain guide plate 90 which rotatably receives the idler shaft 32, and is in turn received in a recess 92 in the channellike side 21 of the bed 20. The inner ends of the fins 84 of the idler sprockets 34 are notched at 94 to provide clearance for the material-engaging portions 44 of the flights as the links to which the flights are attached pass over the idler sprockets 34.

Figure 2:
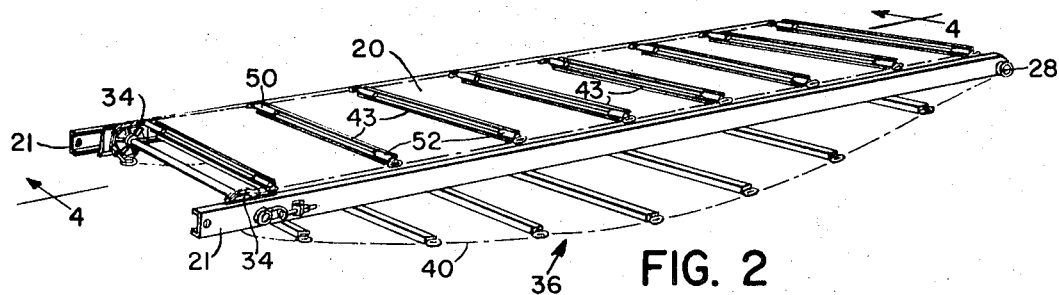
FIG. 2 is a perspective of the conveyor floor removed from the spreader of FIG. 1 and showing the conveyor chain thereon.
Figure 3:
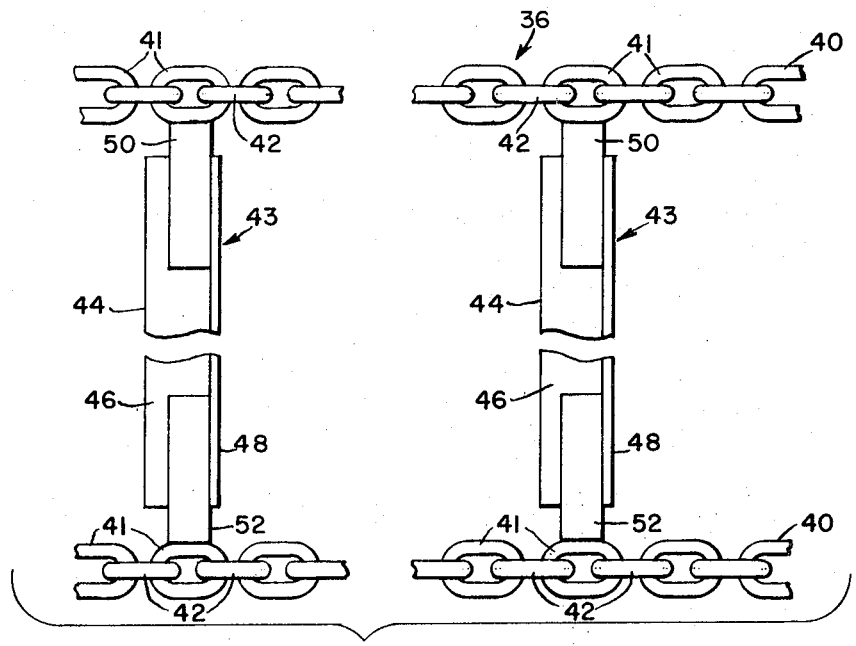
FIG. 3 is a fragmentary top view of the conveyor chain.

In operation, the spreader hitch 22 and power takeoff 24 are connected to a tractor (not shown). The power takeoff is engaged in a manner well known in the art to drive the conveyor drive shaft 28 clockwise, as viewed in FIGS. 2 and 4. Since the drive sprockets 30 are fixedly attached to the drive shaft 28, they also rotate clockwise and the teeth 56 of the sprockets drivingly engage the log chains 40 with the vertical links 42 disposed in the annular U-shaped groove 62, with the horizontal links 41 supported upon the right and left ledges only 64 (being shown) and 68–70 of the leading and trailing portions of adjacent teeth 56 and with the central right and left driving portions 72 and 74, respectively, of adjacent teeth at opposite ends of the horizontal links 41. The connecting portions 50 and 52 of the flights are received in the semicylindrical spaces 78 between the teeth 56 as the horizontal links to which they are attached pass over the drive sprockets. The chain guide plates 90 at the outer ends of the idler sprockets 34 guide the chains 40 over the sprockets and the radial fins 84 of the sprockets span the vertical links 42 of the chains 40 and support the horizontal links 41. When the horizontal links carrying the flights 43 pass over the idler sprockets 34, the connecting portions 50 and 52 of the flights ride on the outer radial surfaces of the fins 84. The vertical links 42 are supported on the edge 86 on the hub 82 between the opposite ends of the respective idler sprockets 34 and material passing between the idler sprockets and the chains 40 is crushed by the edge 86.

The open construction of the drive sprockets 30 and idler sprockets 34 permits material to be carried over them and shed without becoming lodged in working areas thereon.

I claim:

1. A floor conveyor comprising: a bed, a drive shaft rotatably mounted at one end of the bed and an idler shaft mounted at the other end of the bed, a pair of drive sprockets mounted for rotation with said drive shaft at opposite sides of the bed, a pair of idler sprockets mounted for rotation with said idler shaft at opposite sides of the bed in longitudinal alignment with said drive sprockets, a pair of chains operatively mounted on said drive and idler sprockets, a plurality of conveyor flights disposed generally normal to said chains interconnecting selected ones of opposite links of said chains, said conveyor flights each including a central material-engaging portion having opposite ends spaced laterally inwardly from said chains and connecting portions at each end fixedly secured to one side of said selected ones of said links and to said material-engaging portion, each of said drive sprockets including a plurality of equispaced teeth having a width in the direction of the axis of rotation of said drive shaft greater than the acid of rotation of said drive shaft the lateral extent of said chains, and cooperating surfaces on adjacent teeth shaped for drivingly engaging said connecting portions of said conveyor flights.

2. The invention defined in claim 1, wherein said connecting portions are cylindrical and said cooperating surfaces form portions of a cylinder.

3. A floor conveyor comprising: a bed, a drive shaft rotatably mounted at one end of the bed and an idler shaft rotatably mounted at the other end of the bed, a pair of drive sprockets mounted for rotation with the drive shaft at opposite sides of the bed, a pair of idler sprockets mounted for rotation with the idler shaft at opposite sides of the bed in longitudinal alignment with said drive sprockets, a pair of log chains operatively mounted on said drive and idler sprockets and having alternate horizontal and vertical links with respect to said bed, a plurality of conveyor flights disposed generally normal to said log chains interconnecting selected ones of said horizontal links of each chain, said conveyor flights each including a pair of connecting portions located at opposite ends of and connected to a central material-engaging portion having its opposite ends spaced laterally inwardly from said log chains and each of said idler sprockets including a hub having a plurality of equispaced radially extending fins located circumferentially thereabout, said fins having a width in the direction of the axis of rotation of the idler shaft grater than the lateral extent of said chains and meshing between adjacent vertical links of the respective chains and engaging said horizontal links.

4. The invention defined in claim 3 wherein said hub tapers radially outwardly from its opposite ends to form an intermediate annular edge.

5. The invention defined in claim 3 and further including a pair of chain guide plates mounted at the opposite sides of said bed and wherein the opposite ends of said idler shaft are rotatably received within, and the outer ends of said idler sprockets bear against said guide plates.

6. The invention defined in claim 3 wherein said fins are notched at their inner ends for accommodating said material-engaging portions of said flights when the links to which the flights are connected pass over the idler sprockets.

7. The invention defined in claim 6 wherein said hub tapers radially outwardly from its opposite ends to form an intermediate annular edge.

8. The invention defined in claim 6 and further including a pair of chain guide plates mounted at the opposite sides of said bed and wherein the opposite ends of said idler shaft are rotatably received within, and the outer ends of said idler sprockets bear against said guide plates.

9. The invention defined in claim 3 wherein said hub tapers radially outwardly from its opposite ends to form an intermediate annular edge and further including a pair of guide plates mounted at the opposite sides of said bed and wherein the opposite ends of said idler shaft are rotatably received within and the outer ends of said idler sprockets bear against said guide plates.

10. The invention defined in claim 6 wherein said hub tapers radially outwardly from its opposite ends to form an intermediate annular edge and further including a pair of chain guide plates mounted at the opposite sides of said bed and wherein the opposite ends of said idler shaft are rotatably received within, and the outer ends of said idler sprockets bear against said guide plates.

* * * * *

UNITED STATES PATENT OFFICE
CERTIFICATE OF CORRECTION

Patent No. 3,643,786        Dated 22 February 1972

Inventor(s) Raymond Steele Wilkes

It is certified that error appears in the above-identified patent and that said Letters Patent are hereby corrected as shown below:

Column 3, line 35, cancel "the acid of rotation of said drive shaft".

Signed and sealed this 10th day of April 1973.

(SEAL)
Attest:

EDWARD M. FLETCHER, JR.        ROBERT GOTTSCHALK
Attesting Officer        Commissioner of Patents